(12) United States Patent
Mutagi et al.

(10) Patent No.: US 9,747,070 B1
(45) Date of Patent: Aug. 29, 2017

(54) CONFIGURABLE STATE MACHINE ACTIONS

(71) Applicant: Amazon Technologies, Inc., Seattle, WA (US)

(72) Inventors: Rohan Mutagi, Redmond, WA (US); David Ross Bronaugh, Seattle, WA (US); Willy Lew Yuk Vong, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 239 days.

(21) Appl. No.: 14/563,380

(22) Filed: Dec. 8, 2014

(51) Int. Cl.
G06F 3/048 (2013.01)
G06F 3/16 (2006.01)
G10L 17/22 (2013.01)
G06F 3/0484 (2013.01)

(52) U.S. Cl.
CPC .......... *G06F 3/167* (2013.01); *G06F 3/04842* (2013.01); *G06F 3/165* (2013.01); *G10L 17/22* (2013.01)

(58) Field of Classification Search
CPC ................................. G06T 13/00; G09B 5/065
USPC ......................................... 715/728, 727, 967
See application file for complete search history.

(56) References Cited

U.S. PATENT DOCUMENTS 5,810,599 A * 9/1998 Bishop ................... G09B 5/065
434/118
2005/0225552 A1* 10/2005 Anand .................... G06T 13/00
345/473

\* cited by examiner

*Primary Examiner* — Andrey Belousov
(74) *Attorney, Agent, or Firm* — Lee & Hayes, PLLC (57) ABSTRACT

In a system in which an in-home audio device is supported by a network-based support service, certain aspects of the behavior of the audio device may be implemented as a state machine. A graphical user interface (GUI) may be provided by the support service to allow editing of a model representing the state machine of the device. Through the GUI, a user or developer can associate functions with states or state transitions of the state machine. In addition, the user or developer can associate custom code with individual states or state transitions of the state machine.

20 Claims, 6 Drawing Sheets

CONFIGURABLE STATE MACHINE ACTIONS

BACKGROUND

Certain types of devices can be designed to interact with a user through speech. A user may provide a command by uttering speech. The device may respond with speech as part of a speech dialog. In response to a user intent determined by means of the speech dialog, the device may perform an action, such as playing music or providing information by speech.

A device such as this may be configured to perform various types of activities, such as playing music, reporting news, activating or controlling home appliances or other devices, performing general home automation, etc.

Operation of a device such as this is typically governed by software that the device executes. Often, specific behaviors and modes of the device are interdependent and governed by external stimuli. The response by a device to a given stimulus may depend on the current context or activity of the device. The software typically contains complex conditional logic that attempts to respond as desired by the developer of the device to any given stimulus at any given time.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure pertains generally to a system that interacts with users through speech to provide functions and services. An audio device in a home or other premises of a user may be controlled or supported by a network-based support service, which may be configured to interact with the user by generating speech messages on the audio device and responding to speech of the user that is received by the audio device. The audio device may also be configurable to play audio content such as music and to perform other functions such as home automation.

Certain aspects of the device's behavior may be implemented in the form of a state machine that has multiple states and state transitions. The states and transitions correspond to activities that can be performed by the device, statuses of users, and external conditions such as may be indicated by sensors or other equipment from which the device receives information.

The device may be configured to receive a state machine specification and/or modifications to a state machine specification from the support service, in order to dynamically configure the behavior of the device. The support service may implement a graphical user interface (GUI) that interacts with a user or developer to define and display a graphical representation of a state machine model that represents the state machine of the device. Software functions may be associated with each of the states of the state machine model and/or with each of the state transitions of the model.

The GUI may be used by developers of the device to visually specify desired behaviors of the device. For example, a developer may create a state machine model that defines states, state transitions, and events that trigger the state transitions. The developer may also specify actions to be performed in conjunction with particular states or state transitions.

The GUI may also be used by a user of the device to customize behaviors of the device. In these situations, the GUI may display a state machine model representing the default behavior of the device, and the user may modify certain aspects of the state machine model to effect changes in the default behavior. For example, a user may select a particular device-supported software function that is to be called or otherwise initiated in conjunction with a state or a state transition. The device function may be selected from a library of callable software functions that are provided or supported by the operating software of the device. A software function may be called by including a statement or instruction in the state machine code that names or references the software function, wherein the instruction indicates that the named or referenced function is to be invoked.

In addition to associating device-supported software functions with states or state transitions, a user or developer may provide custom code or code modules to be executed in conjunction with states or state transitions. This allows the user or developer to implement behavior that may not be directly provided by the available or preexisting software functions of the device.

When a user or developer has finished designing or modifying the state machine model, the support service generates state machine code that is executable by the device to implement the state machine represented by the model and provides the code to the device. The device receives and executes the state machine code. A given device may be configured to concurrently execute multiple state machines pertaining respectively to different activities.

Figure 1:
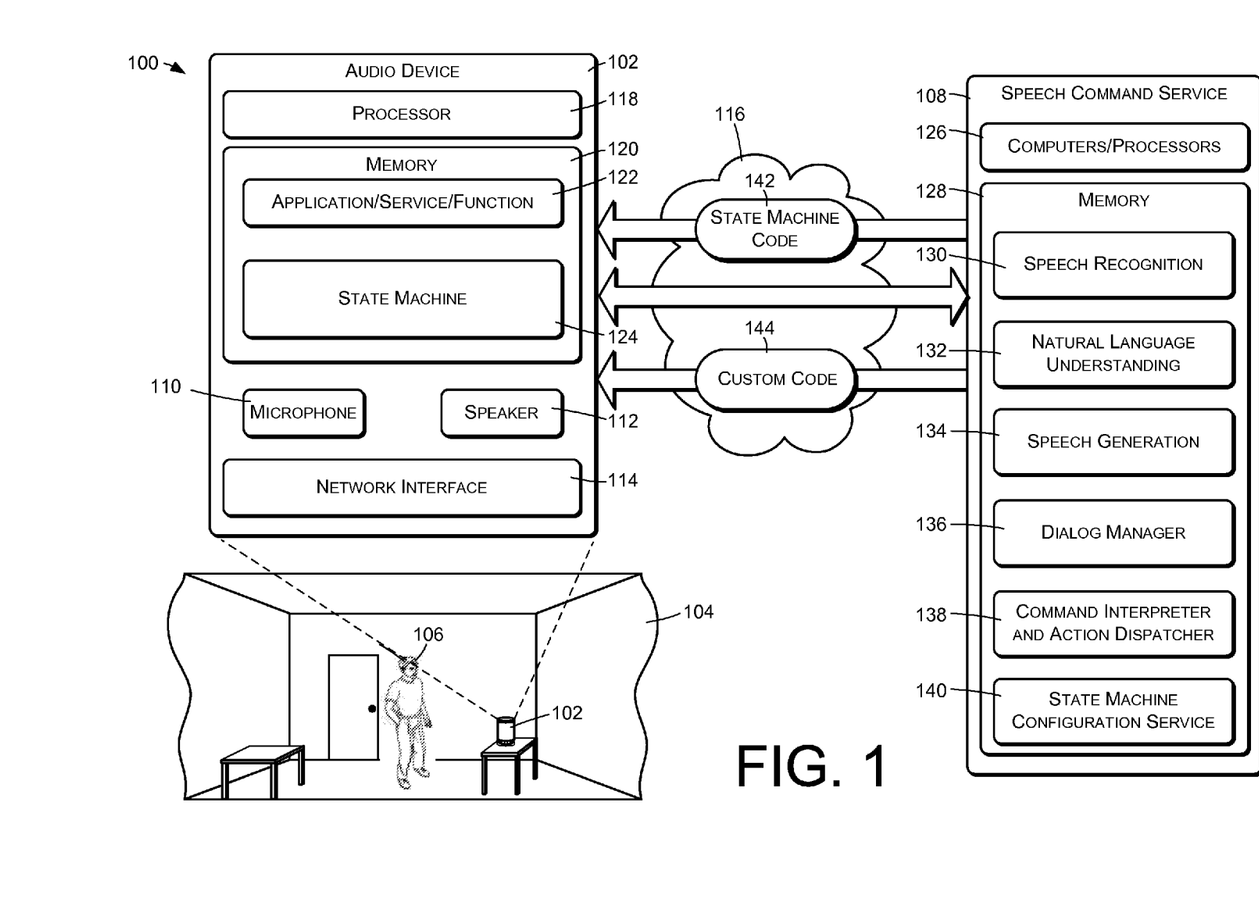
FIG. 1 is a block diagram of an illustrative voice interaction computing architecture that includes a local audio device and a remote speech command service.

FIG. 1 shows an example of a voice interaction computing system 100. The system 100 may include or may utilize a speech interface device or other audio device 102 that is capable of playing various types of audio. The audio device 102 may be located within an environment 104 such as a home to provide services for a user 106. The audio device 102 may operate in conjunction with and/or under the control of a remote, network-based speech command service 108, also referred to herein as a support service 108, that is configured to receive audio, to recognize speech in the audio, and to perform functions or services in response to the recognized speech. Furthermore, as will be described in more detail below, the support service 108 may provide configuration information to the audio device 102 such as code that can be executed by the audio device 102 to implement a state machine.

In an example implementation, the audio device 102 may have one or more microphones 110 and one or more audio speakers or transducers 112 to facilitate speech interactions with the user 106. The audio device 102 may have a network communications interface 114 for communicating over a communications network 116 with the support service 108. The audio device 102 may receive spoken command expressions from the user 106 and may provide services or perform actions in response to the commands. For example, the user may speak a predefined wake or trigger expression (e.g., "Awake"), which may be followed by commands or instructions (e.g., "I'd like to go to a movie. Please tell me what's playing at the local cinema."). Provided services may include performing actions or activities, rendering media, obtaining and/or providing information, providing information via generated or synthesized speech via the audio device 102, initiating Internet-based services on behalf of the user 106, performing actions relating to home automation and control, and so forth.

The speech command service 108 may conduct speech dialogs to determine user intent. Generally, a speech dialog comprises a sequence of speech questions, answers, and/or statements pertaining to a particular action or intent of the user. More specifically, a speech dialog may comprise a series of speech expressions that may include utterances by the user 106 and speech messages generated by the speech command service 108. A speech dialog, for example, may begin upon an initial user utterance. The speech command service 108 may respond with a speech messages, such as "what do you want to do?" The user may respond by making a statement in answer to the question. This process may iterate until the speech command service 108 is able to determine a specific action to take or function to invoke.

The audio device 102 includes operational or control logic, which may comprise a processor 118 and memory 120. The processor 118 may include multiple processors and/or a processor having multiple cores. The processor 118 may comprise processor extensions, co-processors, digital signal processors, and so forth.

The memory 120 may contain applications and programs in the form of computer-executable instructions that are executed by the processor 118 to perform acts or actions that implement desired functionality of the audio device 102, including the functionality described herein. The memory 120 may be a type of computer-readable storage media and may include volatile and nonvolatile memory. Thus, the memory 120 may include, but is not limited to, RAM, ROM, EEPROM, flash memory, or other memory technology.

The audio device 102 may include a plurality of applications, services, and/or system functions 122, referred to collectively below as functional components 122, which are executable by the processor 118 to provide services and functionality. The applications and other functional components 122 may include media playback services such as music players. Other services or operations performed or provided by the applications and other functional components 122 may include, as examples, requesting and consuming entertainment (e.g., gaming, finding and playing music, movies or other content, etc.), personal management (e.g., calendaring, note taking, etc.), online shopping, financial transactions, database inquiries, person-to-person voice communications, home control monitoring and control, and so forth. The functional components 122 may have software interfaces that can be called by other software components of the audio device 102 or by the speech command service 108. The software interfaces may expose callable software functions that can be invoked by other software of the audio device 102. The software functions may include procedures, routines, programs, and/or applications that are provided by the audio device 102.

Among other software components that are not shown, the memory 120 may contain a state machine 124 implemented by instructions, code, or program modules that are executed by the processor 118. The state machine 124 defines multiple states, corresponding respectively to states of the audio device 102 and/or to other objects or activities. For example, one state might correspond to the device activity of playing music. Another state might correspond to the device activity of playing speech as part of a speech dialog. Yet another state might correspond to the device activity of listening for speech of the user during an active speech dialog.

States may also correspond to user properties or statuses, such as the user being home; the user listening to music; the user speaking; etc. States may also correspond to status or conditions of equipment that is monitored by the audio device 102 such as the on/off status of lights, appliances, and devices; states of windows and doors (i.e. whether they are open or closed); times of day (i.e., whether it is night or day); and so forth. In some cases, states may correspond to logical constructs such as delays, conditional evaluations, determinations, notices, data values, etc.

The state machine 124 also defines state transitions corresponding to triggers, events, and/or actions. A transition from one state to another is triggered by an event such as a command from the user 106, a command from the speech command service 108, an input from a sensor, expiration of a time period, detection of a condition, etc. For example, a state transition may correspond to a request for the audio device to play audio, and one of the states may correspond to playing the audio.

There may be more than one transition from a given state, corresponding to different triggering events. Device functions may be associated with each state or state transition. When a particular transition is triggered or a particular state is entered, the associated functions are performed.

Figure 2:
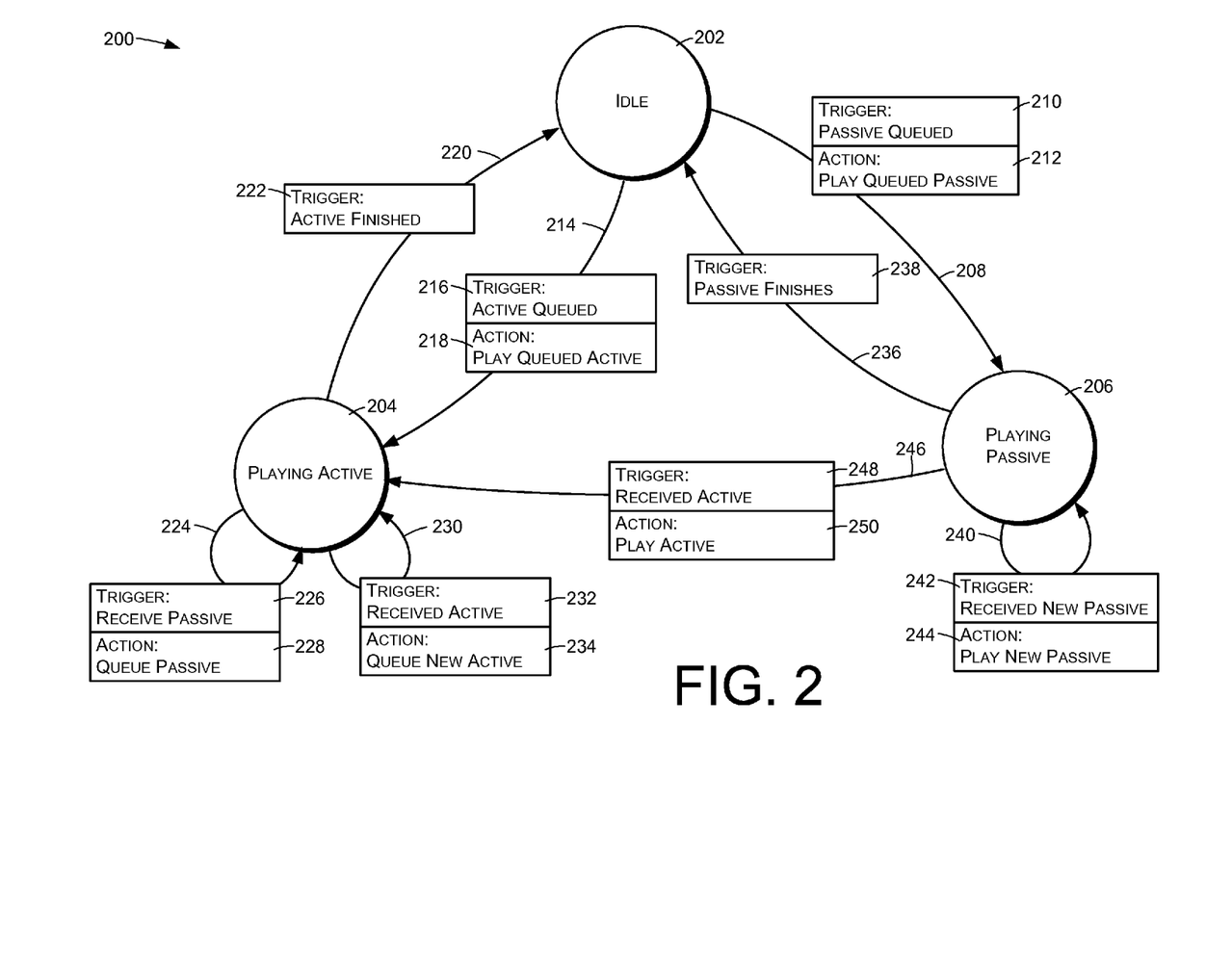
FIG. 2 is a diagram showing an example state machine model.

FIG. 2 shows a state machine model 200, corresponding to a simplified example of a state machine such as may be implemented by the audio device 102. Note that although the audio device 102 is described as operating in accordance with a single state machine for purposes of discussion, a given device may independently and concurrently implement multiple state machines. The state diagram model 200 of FIG. 2 represents states of the device 102 relating to audio and speech playback by the device 102.

The example state machine model 200 represents a state machine as different types of state machine elements, which include states, state transitions, triggers, and actions. The model 200 has three states: an "idle" state 202, a "playing active" state 204, and a "playing passive" state 206. The state machine occupies one state at any given time.

The idle state 202 indicates that the audio device 102 is not currently playing audio. The playing active state 204 indicates that the audio device 102 is playing "active" audio, where active audio comprises system-generated speech such as may be part of a user dialog. The playing passive state 206 indicates that the audio device 102 is playing "passive" audio such as music that does not require active user attention. Generally, active audio is considered more essential or critical to the user than passive audio, and passive audio can be interrupted to play active audio.

The model 200 defines transitions, indicated by directed edges or lines between the states. Each transition is associated with an event that triggers the transition, referred to in FIG. 2 as a trigger. Each transition occurs in response to the associated trigger. Certain transitions may also have an associated action that is performed in conjunction with the transition. As explained in more detail in the following discussion, an action may comprise a device-supported function or arbitrary executable code that is provided by a user of the device 102 or a developer of the system 100.

There is a transition 208 from the idle state 202 to the playing passive state 206. The transition 208 happens in response to a trigger 210, which corresponds to the availability of passive audio that has been queued and/or is ready to be played by the audio device 102, such as may be the case after the audio device 102 receives a command to play the passive audio. An action 212 associated with the transition 208 comprises playing the queued passive audio.

The state machine model 200 has a transition 214 from the idle state 202 to the playing active state 204. The transition 214 happens in response to a trigger 216, which comprises the availability of active audio that has been queued or is ready to be played by the audio device 102, such as may happen after the audio device 102 receives a command to play the active audio. An action 218 associated with the transition 214 comprises playing the queued active audio.

There is a transition 220 from the playing active state 204 back to the idle state 202, which happens in response to a trigger 222 that occurs when the currently playing active content finishes. There is no action associated with the transition 220.

A transition 224 happens in response to a trigger 226 of receiving a command to play specified passive audio while in the playing active state 204. An action 228 associated with the transition 224 comprises queuing the specified passive audio for later playback. The transition 224 is both from and back to the playing active state 204, meaning that the currently playing active audio continues to play even after receiving the command to play the passive audio. In other words, passive audio does not interrupt active audio.

A transition 230 happens in response to a trigger 232 of receiving a command to play specified active audio while in the playing active state 204. An action 234 associated with the transition 230 comprises queuing the specified active audio for later playback. The transition 230 is both from and back to the playing active state 204, meaning that the currently playing active audio continues to play even after receiving the command to play the additional active audio. In this case, the newly requested active audio will be played after the currently playing active audio.

There is a transition 236 from the playing passive state 206 back to the idle state 202, which happens in response to a trigger 238 that occurs when the currently playing passive content is stopped or finishes. There is no action associated with the transition 236.

A transition 240 happens in response to a trigger 242 of receiving a command to play specified passive audio while in the playing passive state 206. An action 244 associated with the transition 240 comprises queuing the specified passive audio for later playback. The transition 240 is both from and back to the playing passive state 206, meaning that the currently playing passive audio continues to play even after receiving the command to play the new passive audio, and the new passive audio is queued for playback after completion of the currently playing passive audio.

A transition 246 happens in response to a trigger 248 of receiving a command to play specified active audio while in the playing passive state 206. An action 250 associated with the transition 246 comprises immediately playing the specified active audio, which may involve muting or stopping the currently playing passive audio. The transition 246 is from the playing passive state 206 to the playing active state 204. The action 250 associated with the transition 246 ensures that active audio interrupts passive audio.

The simplified example of FIG. 2 illustrates the use of a state machine model to govern how requests for different types of audio playback are handled, where active audio is given priority over passive audio. In practice, the state machine 124 may be more complex, and may have many more states and transitions. Furthermore, a state machine may be represented and implemented in ways other than shown by FIG. 2, and a given device may concurrently implement many state machines.

Returning to FIG. 1, the speech command service 108 may in some instances be part of a network-accessible computing platform that is maintained and accessible via the network 116. Network-accessible computing platforms such as this may be referred to using terms such as "on-demand computing", "software as a service (SaaS)", "platform computing", "network-accessible platform", "cloud services", "data centers", and so forth.

The audio device 102 and/or the speech command service 108 may communicatively couple to the network 116 via wired technologies (e.g., wires, universal serial bus (USB), fiber optic cable, etc.), wireless technologies (e.g., radio frequencies (RF), cellular, mobile telephone networks, satellite, Bluetooth®, Wi-Fi, etc.), or other connection technologies. The network 116 is representative of any type of communication network, including data and/or voice network, and may be implemented using wired infrastructure (e.g., coaxial cable, fiber optic cable, etc.), a wireless infrastructure (e.g., RF, cellular, microwave, satellite, Bluetooth®, Wi-Fi, etc.), and/or other connection technologies.

The support service 108 receives an audio stream from the audio device 102, recognizes speech represented by the audio stream, determines user intent from the recognized speech, and performs an action or service in response to the user intent. The provided action may in some cases be performed in conjunction with the audio device 102 and in these cases the speech command service 108 may return a response to the audio device 102 indicating a command that is to be executed by the audio device 102. In some cases, the support service 108 may generate speech audio that is returned to and played by the audio device 102.

The speech command service 108 includes operational or control logic, which may comprise one or more servers, computers, and or processors 126. The speech command service 108 may also have memory 128 containing applications and programs in the form of instructions that are executed by the servers, computers, or processors 126 to perform acts or actions that implement desired functionality of the speech command service 108, including the functionality specifically described herein. The memory 128 may be a type of computer storage media and may include volatile and nonvolatile memory. Thus, the memory 128 may include, but is not limited to, RAM, ROM, EEPROM, flash memory, or other memory technology. In certain implementations, the speech command service 108 may comprise a plurality of servers configured to support and communicate with multiple audio devices 102 over the Internet.

Among other software components that are not shown, the speech command service 108 may include automatic speech recognition (ASR) functionality 130 that recognizes human speech in an audio signal provided by the audio device 102 from the microphone 110. Software of the speech command service 108 may also include natural language understanding (NLU) functionality 132 that determines user intent based on user speech that is recognized by the speech recognition functionality 130.

Software elements of the speech command service 108 may further comprise speech generation functionality 134 that synthesizes or otherwise produces speech audio. For example, the speech generation functionality 134 may comprise a text-to-speech component that produces speech from text to produce speech messages to be played at the audio device 102.

The software of the speech command service 108 may also include a dialog manager 136 that conducts speech dialogs with the user 106 through the audio device 102. A dialog may comprise a series of speech exchanges, as described above, that pertain to a particular intent that the user 106 is trying to express.

Software of the speech command service 108 may also comprise a command interpreter and action dispatcher 138 (referred to herein simply as a command interpreter 138) that determines functions or commands corresponding to user intents. In some cases, commands may correspond to functions that are to be performed at least in part by the audio device 102, and the command interpreter 138 may in those cases provide commands to the audio device 102 for implementing such functions. Examples of commands or functions that may be performed by the audio device 102 in response to directives from the command interpreter 138 include playing music or other media, increasing/decreasing the volume of the speaker 112, generating audible speech through the speaker 112, and so forth.

The speech command service 108 may have a state machine configuration service 140 that can be used by a person such as the user 106 or a software developer to configure the state machine 124 of one or multiple audio devices 102. The state machine configuration service 140, referred to below simply as the configuration service 140, may comprise or may implement a network-accessible graphical user interface (GUI) such as a website that may be accessed by authorized persons. The GUI may in some cases comprise a graphical state machine model editor that allows a person to construct, view, and manipulate a state machine model or certain aspects of a state machine model. For example, the GUI may be accessible to the user 106 to allow the user to specify which of multiple available actions are to be associated with each state transition of a state machine model.

The configuration service 140 may be configured to generate state machine code 142 based on the state machine model produced by the GUI of the configuration service 140. The state machine code 142 may be provided to the audio device 102. The audio device 102 may receive the state machine code 142 and replace the existing state machine 124 with the newly received state machine code 142. In some cases, the state machine code 142 may be provided in a lightweight, cross-platform programming or scripting language such as the Lua scripting language. Upon receiving the code or prior to its execution, the audio device 102 may compile or assemble the provided state machine code 142 into machine code suitable for the processor 118. Alternatively, the state machine code 142 may be provided by the configuration service 140 as low-level code that is directly executable by the processor 118 without a compiler, interpreter, or assembler.

In addition to allowing a person to specify device functions to be invoked in conjunction with specific states or state transitions, the configuration service 140 may allow a person to create and/or specify custom code 144 and to associate the custom code 144 with a corresponding state or transition of the state machine 124. The custom code 144 may be in a lightweight, cross-platform programming or scripting language such as Lua or in a machine-level code. Upon any particular state transition, the audio device 102 may cause the custom code associated with the transition or with the newly entered state to be executed.

Although the audio device 102 is described herein as a voice-controlled or speech-based audio interface device, the techniques described herein may be implemented in conjunction with various different types of devices, such as telecommunications devices and components, hands-free devices, entertainment devices, media playback devices, and so forth.

Figure 3:
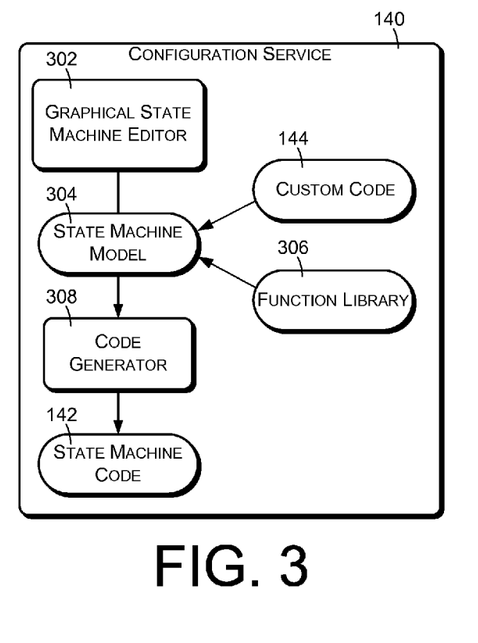
FIG. 3 is a block diagram showing example logical components of a configuration service.

FIG. 3 shows logical components and data objects of the configuration service 140. The configuration service 140 implements a graphical state machine editor 302 through which a person such as a user of the audio device 106 or a developer associated with the support service 108 can design or specify aspects of a state machine model 304 that represents the state machine 124 of the audio device 102. As an example, the editor 302 may be implemented to display the state diagram model 304 in a format similar to that shown in FIG. 2. In certain embodiments, the boxes of FIG. 2 that list actions may comprise controls that allow the user or developer to specify one of multiple available functions of the audio device that is to be associated with a corresponding transition. For example, the action 234 of FIG. 2 may be shown as part of a list control that when opened shows function descriptions corresponding respectively to callable software functions of the audio device, from which a person can chose one or more functions to be associated with the transition 230. The software function may be selected from a function library 306, which comprises callable software functions that are provided natively by the audio device 102 and/or the support service 108. For example, the function library 306 may comprise functions that are available through operating system components of the device 102 or the support service 108, such as may be exposed or made available by the operating systems or firmware of the device 102 or support service 108.

In certain implementations, the editor 302 may allow the user or developer to define and/or change the states, transitions, and actions of the state machine model 304, as well as to specify or change other configuration details of the state machine model 304. In some implementations, graphical objects representing states (such as the circles of FIG. 2) may be moved or dragged by the user to visually arrange the state machine model 304. Transitions may be defined in terms of their origin states, their end states, and/or the triggers or events that cause the transitions. The user or developer may also specify actions to be associated with the states and/or state transitions. Generally, an action may be specified to be performed in response to a state transition, in response to entering a state, or in response to leaving a state.

In addition to specifying functions from the function library 306, the user or developer may provide the custom code 144 and may associate the custom code 144 with any of the states or state transitions of the state machine model 304. The user or developer may specify that the custom code 144 is to be executed along with or in conjunction with a state transition, when entering a state, or when leaving a state. In addition, custom code can be specified to detect a triggering event and to initiate a state change in response to the triggering event. The custom code 144 may include multiple code modules that are associated with different states and transitions.

The custom code 144 can be written in a language or script that can be interpreted and/or executed by the audio device 102. In some cases, the code 144 may be written in a device-independent or platform-independent scripting language such as Lua so that it can be executed by either the audio device 102 or the speech interface platform 108. The custom code 144 may call software interfaces or application programming interfaces (APIs) that are supported by the audio device 102 and/or the speech command service 108. Generally, the custom code 144 may be designed to utilize any available resources or capabilities of the audio device 102 and/or the support service 108, such communication capabilities, speech capabilities, sensor capabilities, and software resources.

The custom code 144 can be provided as a text file or as an executable file. In some cases the graphical state machine editor may include capabilities for writing and editing the custom code 144. In some cases the audio device 102 may include a compiler, interpreter, or assembler to facilitate execution of the custom code 144.

The configuration service 140 has a code generator 308 that generates the state machine code 142 based on the state machine model 304 produced by the state machine editor 302. The state machine code 142 may comprise binary code for direct execution by the processor 118 of the audio device 102 or may comprise textual code for interpretation, compilation, and/or execution by the audio device 102.

Figure 4:
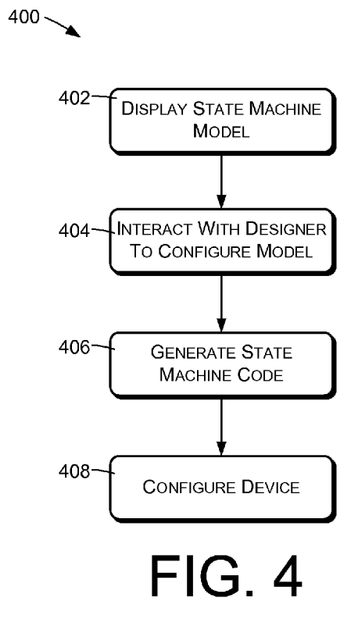
FIG. 4 is a flowchart illustrating an example method of configuring a device using a state machine model.

FIG. 4 illustrates an example method 400 for configuring one or more audio devices or other types of devices in the homes of users or in other premises. The method 400 may be performed by a support service such as the speech command service 108 of FIG. 1 and/or the configuration service 140 of FIG. 3. The devices may comprise speech interface devices such as described above or may comprise other types of devices that are supported by a remote or external service.

An action 402 comprises displaying a state machine model representing a state machine that executes on a device. The state machine model may be represented as elements that include states and state transitions as described above. Each state may correspond to an activity or state of the device itself, to a status of a user, to an environmental status or condition, to the state of a sensor or other device, or to other conditions, states, or statuses.

In the example of the audio device described herein, individual states may correspond to audio activities of the audio device, such as whether the device is playing audio and/or what type of audio the device is playing. For example, the support service may provide a request to the device to play speech as part of a speech dialog with the user of the device, which may cause the device to enter a first state corresponding to the playback of dialog speech. The support service may provide a subsequent request to the device to play music, which may cause the device to enter a second state corresponding to the playing of music.

The states may also correspond to the status of the user of the audio device, such whether the user being home; whether the user listening to music; whether the user speaking; etc. States may also correspond to the status of equipment monitored and/or controlled by the audio device such as home automation equipment, lights, appliances, sensors, and other devices.

An action 404 comprises interacting with a designer, who may comprise a developer, user, or other person, through a graphical user interface (GUI) to configure the state machine model and to receive input by the designer regarding the configuration of the state machine model. The GUI may represent the state machine model in a format such as shown by FIG. 2, in which the illustrated elements can be selected, moved, created, edited, and deleted. In some cases, the GUI may be a web-based interface, implemented as a web site and accessible over the Internet by a user of the device. The GUI may also be implemented as part of a purposed application, such as an application for a computer, a mobile phone, a tablet computer, etc.

The action 404 may include receiving selections or designations of callable software functions that are to be invoked in conjunction with certain states or state transitions. These functions may be chosen by the user from multiple functions that are provided by the operating system or other operating software of the device, such as callable software functions provided by an application programming interface (API) of the device. Callable software functions may also include software functions that are provided by the support service or by other resources accessible to the audio device. In some cases, the action 404 may comprise receiving a selection of a function that has been presented as part of a list of functions on a graphical user interface. In other cases, the action 404 may comprise receiving a designation of a function by the user, where the user types the name of the function into a field or control of the graphical user interface. Function arguments may also be specified by the user.

The action 404 may also include receiving custom instructions or code modules that are specified by the designer for execution by the device in conjunction with corresponding elements of the state machine such as states or state transitions of the state machine.

An action 406 comprises generating state machine code or other instructions that are used or executed by the device to implement the state machine represented by the state machine model and to initiate software functions and custom code modules in conjunction with their associated states or state transitions. Initiating a software function or a custom code module may be performed by a statement or instruction in the state machine code that references the function or code. In some implementations, generating the state machine code may comprise generating a script that is interpreted and executed by the device. In other implementations, generating the state machine code may comprise generating machine-level code that is executed by the device without interpreting or compiling.

An action 408 comprises configuring the device to run or execute the state machine code and any custom code provided by the designer. The action 408 includes configuring the device to call software functions in conjunction with associated states or state transitions and to initiate execution of designer-provided custom code in conjunction with associated states or state transitions. The action 408 may include providing the state machine code or instructions to the device for interpreting and/or execution by the device. The action 408 may also include providing any custom code or instructions to the device for execution by the speech interface device in conjunction with associated states or state transitions.

Figure 5:
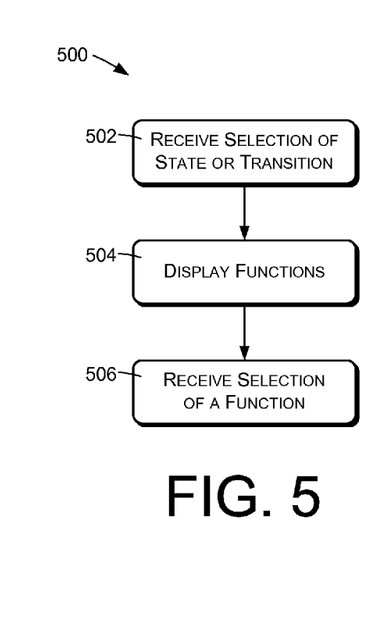
FIGS. 5 and 6 are flowcharts illustrating example actions for associating functions and custom code modules with states or state transitions of a state machine.

FIG. 5 shows example actions 500 that may be performed as part of the action 404 of FIG. 4. An action 502 may comprise receiving a selection by the designer of a state or state transition with which a software function is to be associated. The designer may select a particular state or state transition by using a pointer device, for example. When selecting a state, the designer may also select an aspect of the state such as entry to or exit from the state.

An action 504 comprises, in response to the designer selecting a state or state transition, displaying multiple function descriptions corresponding respectively to different programmatic functions that are provided by operating software of the device, and/or accessible from the device by calling the speech command service. The software functions may comprise native software functions of the device, such as functions that are available through software interfaces or application programming interfaces (APIs) of the device. The software functions may also comprise software functions that are provided by the speech command service and that can be called from the audio device.

An action 506 comprises receiving a selection by the designer of one or more of the displayed functions for association with the state or state transition selected in the action 508. As a result of the selection, the selected function will be called by the device in response to a particular state transition or when entering or exiting a particular state. In some cases, rather than selecting from a precompiled list, the user may designate a function by entering its name or other identifier into a text field.

Figure 6:
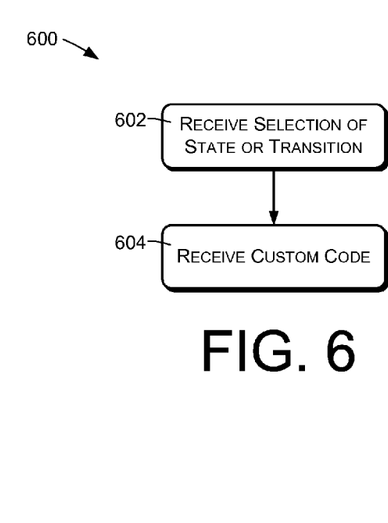

FIG. 6 shows further example actions 600 that may be performed as part of the action 404 of FIG. 4. An action 602 comprises receiving a selection by the designer of a state or state transition with which a custom executable code module is to be associated. The designer may select a particular state or state transition by using a pointer device, for example. When selecting a state, the designer may also select an aspect of the state such as entry to or exit from the state.

An action 604 comprises receiving a custom executable code module from the designer, such by receiving a digital file containing the code module. As a result of these action of FIG. 6, the custom code module will be initiated or executed by the device in response to a particular state transition or when entering or exiting a particular state. For example, the custom code module may be initiated in response to the occurrence of a particular state transition or in response to a particular state being occupied.

Figure 7:
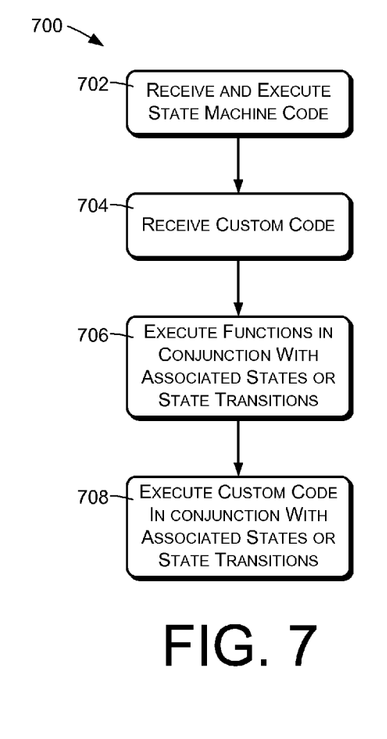
FIG. 7 is a flowchart illustrating an example method implemented by an audio device to execute a state machine and associated functions and custom code modules.

FIG. 7 illustrates example actions 700 that may be performed by an audio device when operating in conjunction with a support service such as described above. An action 702 comprises receiving and executing state machine code that has been created in accordance with the preceding discussion to define a state machine.

An action 704 comprises receiving one or more custom code modules that have been associated with certain states or state transitions of the state model.

An action 706 comprises initiating software functions specified by the received state machine code in response to a state being occupied or a transition occurring, which may include entering and exiting states of the state machine. In some cases, the functions may be executed by the device itself. In other cases, certain of the functions may be executed by the support service.

An action 708 comprises causing custom code specified by the received state machine code, such as the custom code received in the action 704, to be initiated in response to a state being occupied or a transition occurring, which may include entering and exiting states of the state machine. In some cases, the custom code may be executed by the device itself. In other cases, certain modules of the custom code may be executed by the support service. The custom code modules may be written in a platform-independent language so that they can be executed by either the device or the associated support service.

Figure 8:
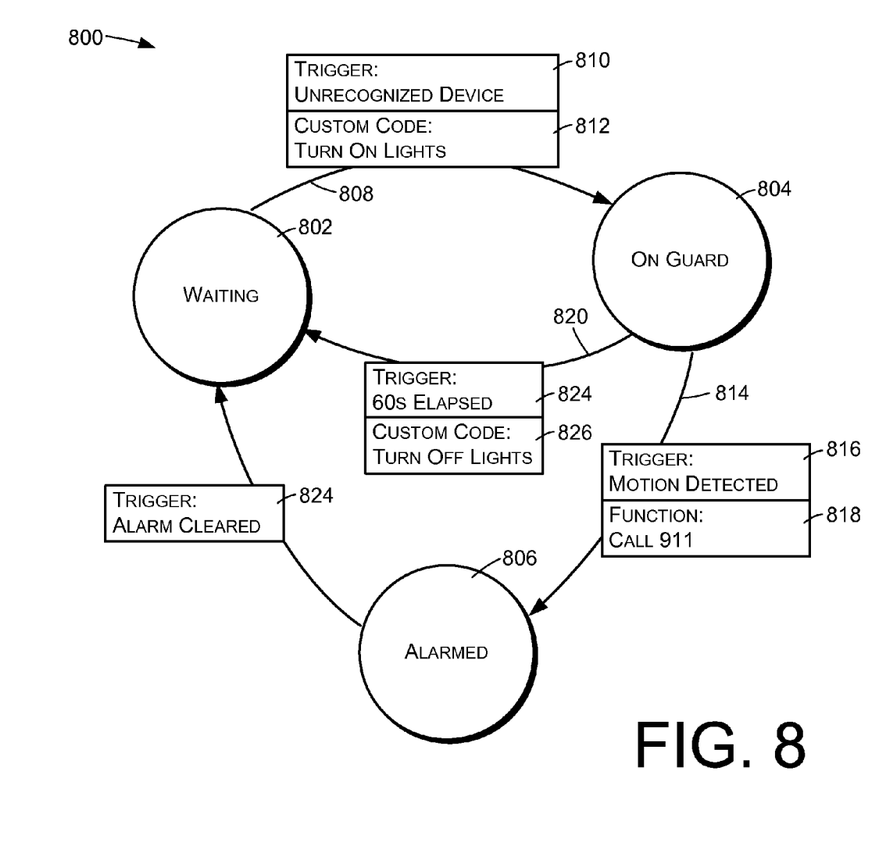
FIG. 8 is a diagram showing another example of a state machine model.

FIG. 8 shows a state machine model 800 having device-supported functions and custom code modules associated with different transitions. The model 800 has a "waiting" state 802, an "on guard" state 804, and an "alarmed" state 806. The model 800 is designed to issue an alarm upon the detection of motion after an unauthorized or unknown device is detected. The model may be displayed by a graphical user interface, which may be manipulated by a person to specify the elements of the model, including the state, transitions, trigger events, and actions.

A transition 808 is from the waiting state 802 to the on guard state 804. In this example, the designer of the state machine has specified that this transition occurs in response to a trigger 810 of detecting an unrecognized device, such as detecting a previously unknown Bluetooth® signal. The designer has also specified an action 812 that is defined by custom code called "turn on the lights." When executed, the custom code accesses devices within a home to turn on the lights of the home.

A transition 814 is from the on guard state 804 to the alarmed state 806. The designer has specified that this transition occurs in response a trigger 816 corresponding to detection of motion. The designer has also specified a device-supported software function 818 called "911" that places an automated call to emergency services in response to this transition.

A transition 820 is from the on guard state 804 back to the waiting state 802. The designer has specified that this transition occurs in response to a trigger 824 corresponding to the expiration of a 60 second period. The designer has also specified an action 826 that is defined by custom code called "turn off the lights." When executed, the custom code accesses devices within a home to turn off the lights of the home.

A transition 822 is from the alarmed state 806 back to the waiting state 802. This transition happens in response to a trigger 202 of the alarm being cleared, such as by receiving an input or signal from a user to clear the alarm.

Figure 9:
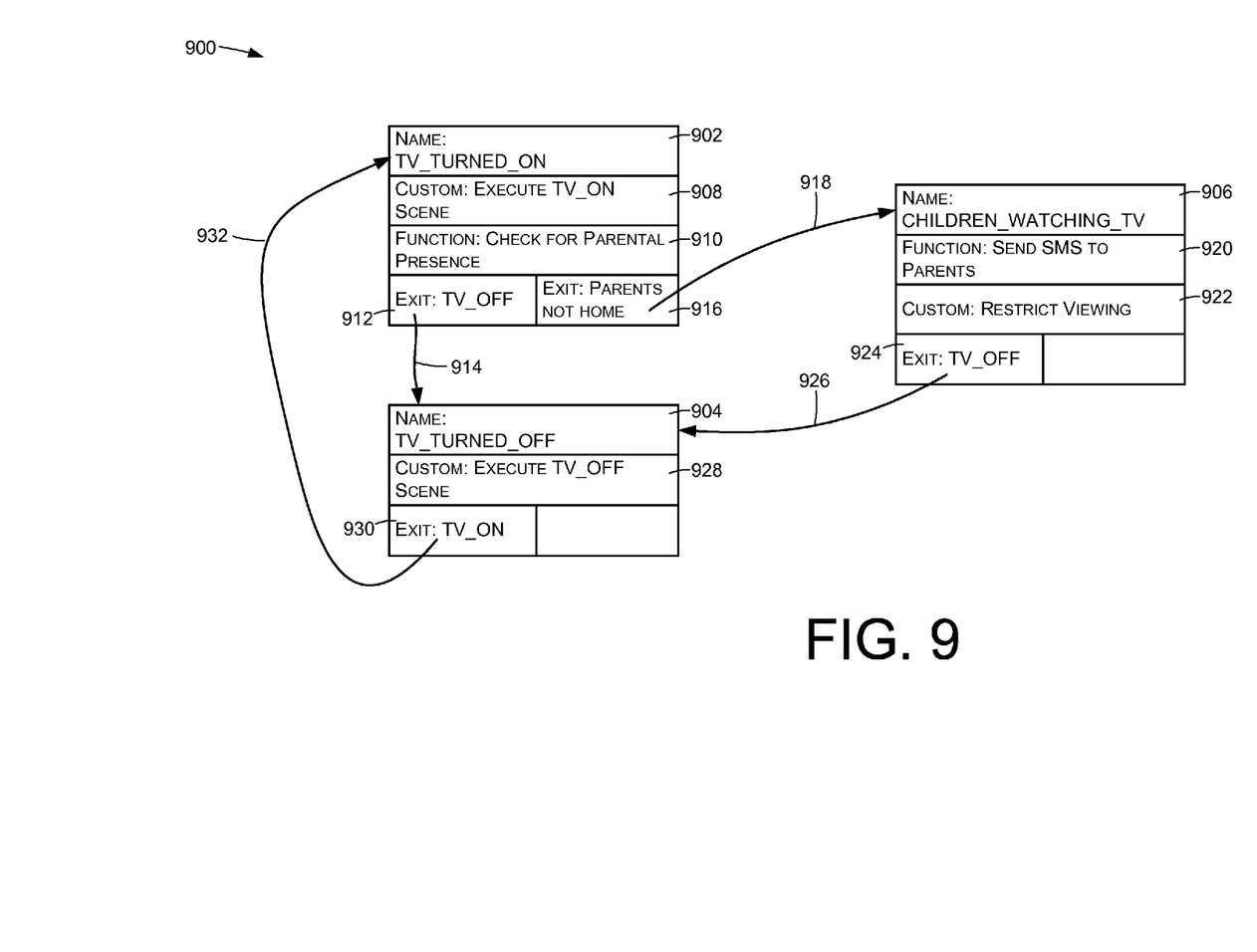
FIG. 9 is a diagram showing yet another example of a state machine model.

FIG. 9 illustrates an example state machine model 900 in which triggers and actions are specified for states and associated by the states with transitions. The graphical state machine model editor described above may be alternatively configured to display state machine models in a format such as this, and to allow the user to specify the illustrated conditions, triggers, and actions of the states.

There are three states in this example: a first state 902 called TV_TURNED_ON, a second state 904 called TV_TURNED_OFF, and a third state 906 called CHILDREN_WATCHING_TV. Each state has one or more actions that are performed upon entering the state. Each state also has one or more exit conditions, each of which corresponds to a state transition.

The first state 902 has an action 908, which comprises executing a custom code module called TV_ON SCENE, which turns on certain preconfigured lights within a home. The first state 902 also has an action 910, which comprises a device-supported or system-supported software function for determining whether a parent is present.

The first state 902 has an exit condition 912 called TV_OFF, which corresponds to receiving an instruction to turn off the TV. The exit condition 912 is associated with a transition 914, which moves to the TV_TURNED_OFF state 904.

The first state 902 also has an exit condition 916 called PARENTS NOT HOME, which corresponds to the condition detected by the action 910 that no parents are present.

The exit condition 916 is associated with a transition 918, which moves to the CHILDREN_WATCHING_TV state 906.

The CHILDREN_WATCHING_TV state 906 has an action 920, which comprises a device-supported software function for notifying the parents by text message that children are watching TV. A custom action 922 comprises a custom code module that interacts with the TV system to restrict viewing by the children to appropriate content. An exit condition 924, called TV_OFF, corresponds to receiving an instruction to turn off the TV. The exit condition 924 is associated with a transition 926, which moves to the TV_TURNED_OFF state 904.

The TV_TURNED_OFF state 904 has an action 928 comprising custom code that interacts with home automation equipment to turn on or off lights in accordance with a preconfigured lighting scene. An exit condition 930 corresponds to receiving a command to turn on the TV. The exit condition 930 corresponds to a transition 932, which moves back to the TV_TURNED_ON state 902.

In the example of FIG. 9, any of the illustrated actions or exit conditions may be specified as either a built-in software function of the system or as custom code. Generally, functions and/or custom code can be specified for or associated with:
 a transition from a first state to a second state;
 an entry into the second state;
 an exit from the first state; or
 a condition of exit from the first state.

The techniques described above may be used by system developers to conveniently test and deploy device configurations, and may be used by device users to implement customized logic and functionality for individual devices. Developers may be given complete access to state machine models, while end users may be given more limited access. For example, end users may in some embodiments be allowed only to specify actions that are to be performed in conjunction with certain pre-defined states or state transitions.

The embodiments described above may be implemented programmatically, such as with computers, processors, digital signal processors, analog processors, and so forth. In other embodiments, however, one or more of the components, functions, or elements may be implemented using specialized or dedicated circuits, including analog circuits and/or digital logic circuits.

Although the subject matter has been described in language specific to certain features, it is to be understood that the subject matter defined in the appended claims is not necessarily limited to the specific features described. Rather, the specific features are disclosed as illustrative forms of implementing the claims.

What is claimed is:

1. A method, comprising:
 displaying a graphical representation of a state machine model, wherein the state machine model represents a state machine of a speech interface device, the state machine having states and state transitions between the states, wherein at least one state of the states corresponds to a status of audio playback by the speech interface device;
 receiving a first selection of a first function of one or more callable software functions provided by the speech interface device, the one or more callable software functions relating to a speech dialog between the speech interface device and a user associated with the speech interface device;
 receiving a second selection of a first element of the state machine with which the first function is to be associated, wherein the first element comprises a first state of the states or a first state transition of the state transitions;
 receiving code, wherein the code is configured to be executed by the speech interface device;
 receiving a third selection of a second element of the state machine with which the code is to be associated, wherein the second element comprises a second state of the states or a second state transition of the state transitions;
 generating state machine code for use by the speech interface device to implement the state machine, wherein the state machine code is configured to (a) call the first function based at least in part on the first state being occupied or the first state transition occurring and (b) initiate execution of the code based at least in part on the second state being occupied or the second state transition occurring;
 providing the state machine code to the speech interface device; and
 providing the code to the speech interface device.

2. The method of claim 1, the state machine code being further configured to initiate execution of the code based at least in part on at least one of:
 an exit from the second state; or
 an entry into the second state.

3. The method of claim 1, wherein generating the state machine code comprises generating a script that is interpreted by the speech interface device.

4. The method of claim 1, wherein:
 the first state transition corresponds to a request for the speech interface device to play audio; and
 the first state corresponds to playing the audio.

5. A method, comprising:
 displaying a state machine model, the state machine model representing a state machine of a device, the state machine having states and state transitions;
 receiving a designation of a software function, the software function designated from multiple software functions provided by the device, the software functions relating to a speech dialog between the device and a user associated with the device;
 receiving a first selection of a first element of the state machine with which the software function is to be associated, wherein the first element comprises at least one of a first state of the states or a first state transition of the state transitions;
 receiving code that is to be initiated by the state machine;
 receiving a second selection of a second element of the state machine with which the code is to be associated, wherein the second element comprises at least one of a second state of the states or a second state transition of the state transitions;
 generating state machine code that is executable by the device to implement the state machine, wherein the state machine code is configured to (a) initiate the software function based at least in part on the first state being occupied or the first state transition occurring and (b) initiate the code based at least in part on the second state being occupied or the second state transition occurring;
 sending the state machine code to the device; and
 sending the code to the device.

6. The method of claim 5, the method further comprising displaying function descriptions corresponding respectively to the software functions, wherein receiving the designation of the software function comprises receiving a third selection of one of the function descriptions.

7. The method of claim 5, wherein generating the state machine code comprises generating a script that is interpreted by the device.

8. The method of claim 5, wherein the states comprise at least one of:
an activity of the device;
a status of the user; or
a status of equipment monitored by the device.

9. The method of claim 5, further comprising:
sending a third request to the device to play speech as part of a speech dialog;
sending a fourth request to the device to play music; and
wherein the first state corresponds to playing the speech and the second state corresponds to playing the music.

10. The method of claim 5, the state machine code being further configured to initiate execution of the code based at least in part on at least one of:
an exit from the second state; or
an entry into the second state.

11. The method of claim 5, wherein:
at least one state transition of the state transitions corresponds to a third request for the device to play audio; and
at least one state of the states corresponds to playing the audio.

12. A system, comprising:
one or more processors; and
one or more non-transitory computer-readable media storing computer-executable instructions that, when executed on the one or more processors, cause the one or more processors to perform acts comprising:
receiving a first selection of a first element of a state machine of a device, wherein the first element comprises at least one of a first state or a first transition to the first state;
receiving a designation of a software function that is to be associated with the first element, the software function being designated from multiple software functions provided by the device, the multiple software functions relating to a speech dialog between the device and a user associated with the device;
receiving a second selection of a second element of the state machine, wherein the second element comprises at least one of a second state or a second transition to the second state;
receiving code that is to be associated with the second element;
causing initiation of the software function based at least in part on the first state being occupied or the first transition occurring; and
causing initiation of the code based at least in part on the second state being occupied or the second transition occurring.

13. The system of claim 12, the acts further comprising displaying function descriptions corresponding respectively to the multiple software functions, wherein receiving the designation of the software function comprises receiving a third selection of one of the multiple software functions.

14. The system of claim 12, the acts further comprising displaying a graphical user interface, wherein the graphical user interface is configured to receive the second selection of the second element and to receive the code.

15. The system of claim 12, the acts further comprising displaying a graphical user interface, wherein the graphical user interface is configured to:
display a state machine model representing the state machine of the device;
receive the second selection of the second element; and
receive the code.

16. The system of claim 12, wherein the state machine represents at least one of:
states of the device;
statuses of the; or
statuses of equipment monitored by the device.

17. The system of claim 12, the acts further comprising:
sending a third request to the device to play speech as part of a speech dialog;
sending a fourth request to the device to play music; and
wherein the first state corresponds to playing the speech and the second state corresponds to playing the music.

18. The system of claim 12, wherein causing initiation of the code is based at least in part on at least one of:
an entry into the second state; or
an exit from the second state.

19. The system of claim 12, wherein:
at least one of the first transition or the second transition corresponds to a third request for the device to play audio; and
at least one of the first state or the second state corresponds to playing the audio.

20. The method of claim 5, the designation comprises a first designation, and further comprising:
receiving a second designation that the first element corresponds to a first priority and the second element corresponds to a second priority, the first priority being greater than the second priority; and
wherein generating the state machine code is based at least in part on the second designation.

* * * * *